350-96.28 SR CROSS REFERENCE SEARCH ROOM
XR 3,237,162
3083Y
2530

Feb. 22, 1966 W. E. GOETZ 3,237,162

PROJECTION APPARATUS

Filed July 2, 1962 2 Sheets-Sheet 1

INVENTOR
WILLIAM E. GOETZ

BY K. P. Johnson
ATTORNEY

3237162
OR IN 340/146.3F

United States Patent Office 3,237,162

Patented Feb. 22, 1966

3,237,162

PROJECTION APPARATUS

William E. Goetz, Endicott, N.Y., assignor to International Business Machines Corporation, New York, N.Y., a corporation of New York Filed July 2, 1962, Ser. No. 206,665
20 Claims. (Cl. 340—146.3)

This invention relates generally to apparatus for identifying by its image a recorded indicium belonging to a limited group of indicia, and more particularly to apparatus for producing and projecting multiple images of the recorded indicium.

Portions of the material herein disclosed have been disclosed and claimed in a copending application for patent, Serial No. 206,636, filed July 2, 1962, by Philip H. Howard entitled "Identification Apparatus" and assigned to the assignee of this application.

The mask matching technique is one of the easiest and simplest methods that can be used to accomplish machine recognition of unknown recorded indicia. This method requires optical apparatus capable of producing an image of a recorded indicium, and projecting the image onto a plurality of masks, each having opaque and transparent areas defining the unique image of a particular one of a predetermined group of indicia. For example, a set of masks may be formed each in the likeness of a different Arabic numeral or letter of the alphabet. An image of the unknown indicium may be projected onto the different masks serially or in parallel. A photo-electric transducer behind each mask transforms the quantity of light passing through the transparent areas into electrical signals which are then compared with each other or stored and compared with standard signals to detect the mask most closely coinciding with the image thereon and signify identification.

In order to increase the capacity of a recognition machine, multiple images of an indicium are projected in parallel onto the masks composing the group permitting simultaneous comparison of the degree of match between images and masks. The usual manner of producing multiple images is to highly illuminate the record surface and reflect light rays therefrom onto a mirror and then into a plurality of distinct lenses or wedges so that each lens gathers the light striking it and projects the light onto a respective mask. Alternative methods are to eliminate the mirror and use only a plurality of lenses or use a plurality of mirrors instead of lenses to directly reflect the light from the record surface onto the masks. With these image projection methods there exists a considerable loss of light because much of the light reflected from the record and mirror is widely dispersed and never collected by the lens or the mirror system. Since the light reflected from the record must be divided proportionately for projection onto each mask, the resulting image quality and illumination efficiency is low. Subsequent comparison of several signals from the transducers is more difficult because of decreased differences between signals.

The conventional image multiplication apparatus also requires that a relatively large amount of space be provided to accommodate the necessary diversions of individual quantities of reflected light necessary to form each image. Diversions occur at the record surface and at each of the succeeding reflective surfaces. A further difficulty in the usual systems is the time and expense required to produce properly aligned optical members, efficient reflecting surfaces, and lenses for the individual multiple image channels. Each image channel requires also an entire separate optical system.

Accordingly, it is an object of this invention to provide image identification apparatus for producing and projecting multiple images of an unknown indicium with improved efficiency and more uniform quality.

Another object of this invention is to provide recognition apparatus for recorded indicia that is compact and inexpensive.

Another object of this invention is to provide recognition apparatus for recorded indicia having optical members which utilize total internal reflection to simultaneously produce multiple images of an unknown indicium arranged in a matrix.

Another object of this invention is to provide recognition apparatus for recorded indicia in which the necessity of a lens system for each parallel image channel is eliminated.

A further object of this invention is to provide recognition apparatus for recorded indicia capable of producing multiple images of a single recorded indicium by total internal reflection and moving those images simultaneously across a plurality of image masks.

A still further object of this invention is to provide recognition apparatus for recorded indicia capable of illuminating the record surface with improved uniformity.

Yet another object of this invention is to provide recognition apparatus for recorded indicia which employs a common optical member for both the illumination of a record surface and generation of multiple images.

A still further object of this invention is to provide recognition apparatus for recorded indicia which utilizes a single optical member to produce uniform multiple images of a single recorded indicium.

A still further object of this invention is to provide recognition apparatus for recorded indicia which employs optical members utilizing total internal light reflection for the generation of a plurality of images from a single image.

In accordance with the foregoing objects, this invention provides, in one embodiment thereof, image multiplying means which includes a source of light and a pair of aligned internally reflective elements. A first reflective element has a plurality of internal plane reflective surfaces disposed parallel with an optical axis thereof, one end of which is normal to and adjacent a record and recorded indicium thereon. At the opposite end of the axis and obliquely positioned therewith is a transparent plane reflective surface for reflecting light from the source onto the internal surfaces and generally along the optical axis to the record. Light striking the record and indicium is reflected therefrom in a reverse direction onto the plane surfaces and successively redirected from one to the other of the internal reflecting surfaces creating multiple images of the indicium. The redirected light passes through the oblique surface into a second similar element for further image multiplication, exiting therefrom to projection means. The projection means includes lens means and scanning means which project a plurality of images from the multiplying means each onto a different one of a plurality of masks in a mask member. Recognition of the unknown projected images is accomplished by an identification means which includes photoelectric transducers to provide electrical signals representative of the degree of match between each mask and the image thereon, and means for comparing the signals to select and identify the mask most closely matching the projected image.

This invention has the advantage of decreasing the amount of light loss by more closely controlling and limiting the reflective paths of the light within a totally internally reflective member, and shortening the usual projection paths from the record to the lens distribution means. By using the illumination scheme as shown in the first embodiment, specular reflection from the recorded character is minimized so that contrast between the character and its background is improved.

The foregoing and other objects, features and advantages of the invention will be apparent from the following more particular description of preferred embodiments of the invention, as illustrated in the accompanying drawings.

Figure 1:
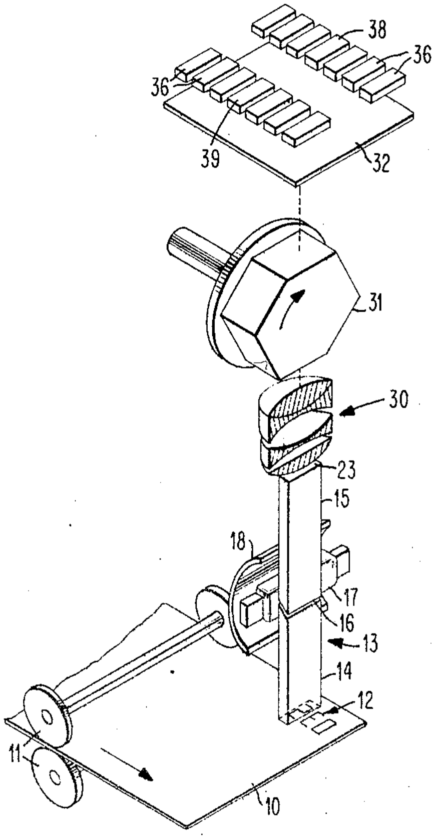
FIGURE 1 is a schematic view in perspective of indicia recognition apparatus illustrating the essential features of the invention.
Figure 3:
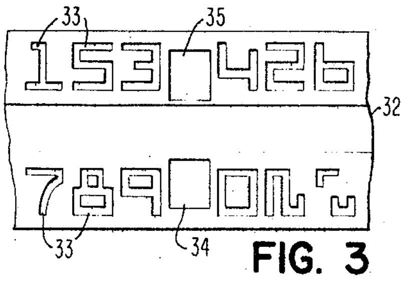
FIGURE 3 is a bottom plan view of the mask member shown in FIG. 1 with a plurality of image and registration masks thereon.
Figure 6:
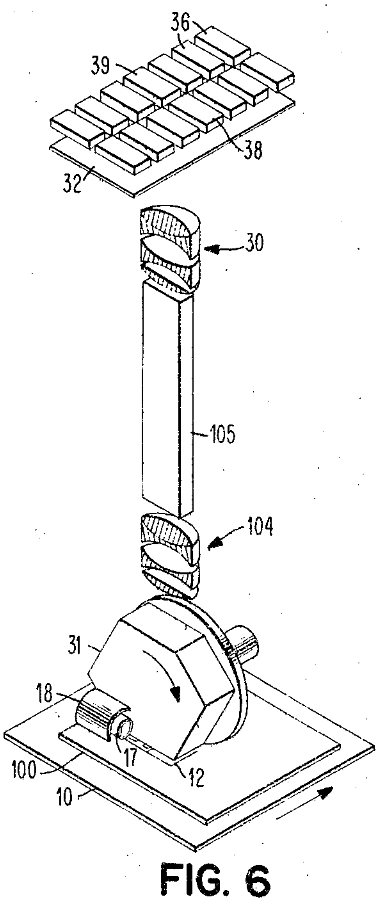
Figure 7:
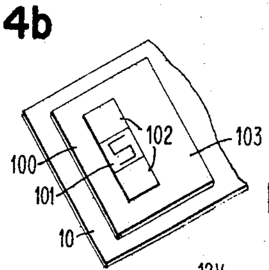
Figure 5:
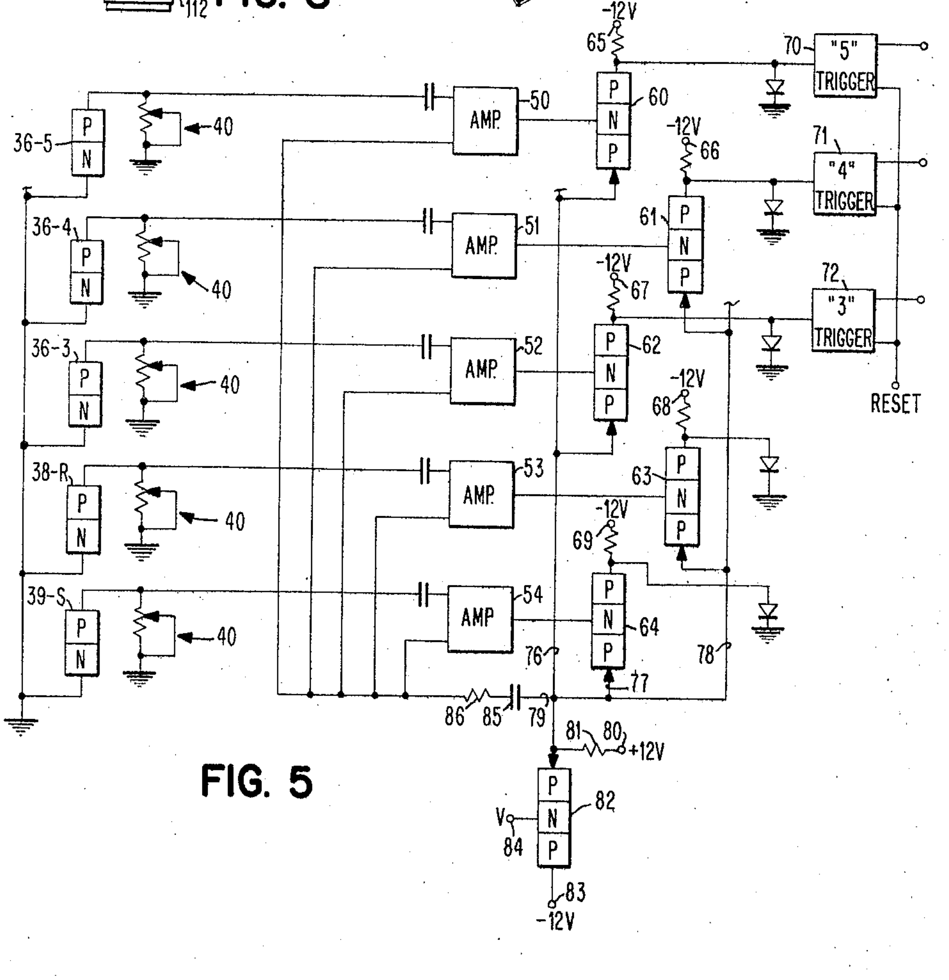

FIGURES *4a*, *4b* and *4c* are partial views of the image and registration masks of FIG. 3 illustrating the progression of projected images thereacross;

FIGURE 5 is a schematic diagram of the electrical identification and registration control circuits used in conjunction with the invention to identify the image mask which most closely matches the projected image thereon;

FIGURE 6 is a perspective view of another embodiment of the image multiplication and projection apparatus shown in FIG. 1;

FIGURE 7 is a view in perspective of an object plane mask shown in FIG. 6; and

Figure 8:
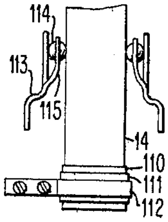

FIGURE 8 is an elevation view of the supporting structure for the image multiplying members shown in FIGS. 1 and 6.

Referring to FIG. 1, a record 10, moved along a predetermined path by any conventional transport mechanism such as feed rolls 12, has printed thereon a line of indicia 11, e.g., the characters "0," "3" and "5." Positioned normally to the record surface is a totally internally reflective member, generally designated 13, for producing multiple images of each recorded indicium and is formed by a lower portion 14 and an upper portion 15 tandemly aligned along a common optical axis. The bottom end of lower portion 14 is positioned within a few thousandths of an inch of the record surface.

Figure 2:
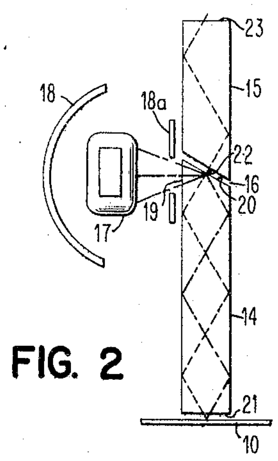
FIGURE 2 is a detailed partial elevation view of the light source and reflective members shown in FIG. 1.

The two portions of reflective member 13 are made of optical glass but may be of any other suitable transparent material of optical quality such as quartz, fused silica, plastics, etc. The reflective member portions have a refractive index larger than that of the surrounding atmosphere and are ground and polished or molded with identical rectangular cross-sectional dimensions to provide total internal reflection of light directed therein. The vertical reflecting sides of optical bars may be coated if desired with a reflective material such as silver or aluminum except on that portion of portion 14 adjacent the light source. The cross-sectional dimensions are approximately equal to the dimensions of the area alloted each recorded indicium, but yet are sufficiently large to provide for the instance when an indicium is printed with some misalignment. Corresponding sides of each portion are located in the same plane. Although not necessary, the upper and lower portions 14, 15 are preferably made identical to each other as to size and configuration to permit interchangeability and facilitate manufacture. Opposite ends of each portion are formed to provide surfaces normal to the optical axis of member 13, and adjacent ends are obliquely formed relative to the axis and are positioned to provide complementary parallel end surfaces with an air space 16 as shown in FIGS. 1 and 2. The air space is a few thousandths of an inch thick, or of the minimum thickness and yet avoiding interference between light rays, generally .003 to .005 inch.

Light for illuminating a character area is supplied by a suitable light source 17 such as an elongated tungsten filament lamp aligned parallel with one side of lower portion 14 near the top thereof. A reflector 18 aids in directing the light from the source toward the lower portion and an apertured shield 18*a* limits the area of portion 14 exposed to the light. Light striking outer surface 19 will be substantially normal thereto and will enter the transparent glass without significant reflection. The glass, being a more dense medium, refracts the light rays toward the normal of the surface 19. Oblique end surface 20 is formed relative to the entering rays so that the refracted light rays hit surface 20 at an angle greater than the critical angle of incidence and are, therefore, reflected downwardly in lower portion 14. This light continues to be totally internally reflected from the sides of portion 14 a plurality of times depending on the length, and finally emerges at end surface 21, since the end is at less than the critical angle of incidence relative to the downwardly reflected rays.

The printed indicia in line 12 (FIG. 1) on record 10 are preferably printed by a dark light-absorbing ink while the record surface is of a light color and reflects light rays therefrom. As a result, the light rays emerging from portion 14 are reflected by the record surface upwardly into portion 14 and form an image of any printed indicium within the character area illuminated by the optical bar. The close proximity of end 21 and record 10 prevent most of the light loss and provide a uniformly illuminated record surface. The upward rays are reflected internally off the sides of member 14 a plurality of times creating multiple images from an object and strike oblique surface 20 at less than the critical angle passing therethrough into air space 16, through parallel end surface 22, and upwardly into bar portion 15, and are again reflected a plurality of times from the sides thereof to emerge at end surface 23. In order to reduce light loss at the glass-air interface, end surfaces 21, 22 and 23 may be coated with a quarter wave length thickness of magnesium fluoride. As evident from the above description, surface 20 and air space 16 are positioned relative to the optical axis of member 13 to reflect light from source 17 and to refract light from record 10. The lower portion 14 thus serves as a dual path for light transmission, and member 13, through the multiple reflections therein, provides multiple images from the single indicium in a character area on the record.

Optically aligned with end 23 of upper portion 15 is a focusing lens system 30 which collects the light rays from optical member 13 and projects them in slightly divergent paths through a conventional rotating scanning prism 31, well-known in the art, to a mask member 32 which is composed of image masks 33 and registration masks 34 and 35, illustrated in more detail in FIGS. 3 and *4a*–*4c*. The light rays emanating upward through surface 23 form a plurality of images of the indicium "5" positioned in the character area record 10, and the lens system 30 is employed either to diminish or enlarge and separate the images as desired and project them through scanner 31. The scanner is rotated by any suitable conventional means and, by varying the amount of light refraction therein, is used to move the plurality of images across the corresponding plurality of image masks and registration masks on mask member 32 in unison. The rotational speed of scanner 31 is preferably such that it will move the projected images 20–30 times across mask member 32 as record 10 moves a printed indicium thereon completely through one character space. It will be noted, however, that scanner 31 may be unnecessary if the record is moved along its path so that images of the indicium in each character area are accurately positioned with respect to the image masks.

Referring to FIG. 3, each image mask is the negative image of a different indicium in the limited group which are to be identified. Each image mask 33 is formed with an opaque background and transparent areas therein of unique configuration and size corresponding to the image of its particular indicium. The image maskes are preferably formed by successive exposure of each indicium in the group on a selectively exposed sensitized photographic film through the same optical system in which the masks are to be later used for identification, thereby insuring that any distortion in the optical system is incorporated in the masks.

The image and regisration masks are aligned in rows, as shown in FIGS. 3 and 4*a*–4*c*, and are positioned so that a projected image will move across each mask simultaneously and in horizontal alignment with the other images. The length of optical member 13 determines the number of images produced, and so is of sufficient length to supply an image for each image and registration mask required for identification. In all image rows, alternate characters will be reversed as illustrated, for instance, by the "2" and "5" masks in the top row of FIG. 3, but the image mask will be properly oriented when formed by selective exposure through the optical system. It will be noted from the figures that the masks are positioned only in the image rows of the same vertical sense, although a row of inverted images will appear on mask member 32 between the two rows shown. In this embodiment, the image movement is produced after the formation of images in member 13 and the rotation of the scanner 31 causes slight relative movement between adjacent rows. However, alternate rows or rows in the same vertical sense will have no movement relative to each other. The spacing of the mask rows is sufficient to insure that image rows of the opposite vertical sense start to move across the mask rows together.

Identification of the projected unknown image is accomplished by determining and identifying the image mask most closely coinciding with the image projected thereon, as described in the above-mentioned application for patent filed by Philip H. Howard. The particular identification apparatus used will be briefly described here, however.

Recognition is performed by comparing electrical signals which vary in amplitude with the quantity of projected image falling on the transparent portion of each mask, and the image mask from which the largest signal is produced is indicated as identifying the image. The varying electrical signals are produced by suitable photoelectric transducers 36 (FIG. 1) located behind the transparent area of each mask and may be well-known photosensitive semiconductors (solar cells). Since the images to be identified are moving across the mask member as shown by image progression in FIGS. 4*a*–4*c*, the transducer signals are weak and variable so that each signal is amplified by a differential amplifier. Comparison is accomplished by a plurality of switching transistors having a common emitter voltage, and the amplified input transducer signals are each supplied to the base of a different one of the transistors. The transistor with the largest input signal is switched on and changes the common emitter voltage. As another transducer produces a larger input signal, it will switch on its respective transistor causing the original transistor to switch off. Thus, when a transistor is turned on its collector will produce a control signal which may be used to operate an indicating device to identify a particular mask.

Figure 4A:
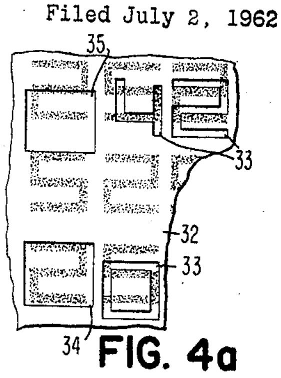
Figure 4B:
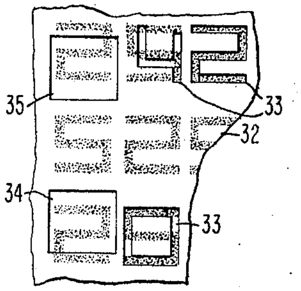
Figure 4C:
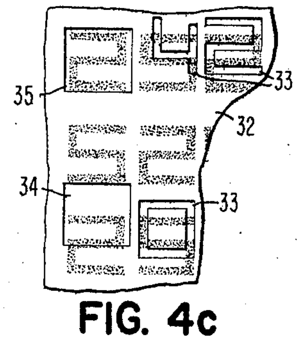

Because of the common movement of the projected images across the image masks, illustrated in FIGS. 4*a*–4*c*, a pair of registration masks 34, 35 substantially entirely transparent, are used to provide a timing control for comparing the signals from the image mask transducers. These registration masks produce an overriding control signal for the switching transistors except when the projected images are in optimum registration with the image masks. The two registration masks are displaced oppositely from alignment with the image masks 33 as shown in FIG. 3. Registration mask 34 is a leading or "R" mask and is displaced upwardly in the figure so that it is the first mask to encounter any image or portion thereof as the images move, for example, downwardly across mask member 32. Registration mask 35 is a lagging or "S" mask and is displaced downwardly in the figure from alignment with the image masks and will be the last mask to encounter any image or portion thereof as the images move downwardly. Each registration mask is approximately 20–25% larger in both height and width than the maximum dimensions of the transparent area of any image mask; this is to insure that any partial or entire image of the plurality of projected images will definitely appear on the registration masks whether or not they appear on an image mask. It will be recalled from the movement of record 10 (FIG. 1) that partial images of an indicium or partial images of two indicia may be projected as the printed characters leave or enter the character area scanned by optical member 13. The "R" and "S" masks 34, 35 are each approximately 95% transparent, having a plurality of minute opaque spots thereon in that portion of the transparent mask area which is usually covered by an image when the remaining projected images are optimumly registered with the respective image masks. The opaque spots are concentrated in the lower central portion of mask 34 and in the upper central portion of mask 35. The purpose of this is to decrease overriding registration signals near the time of optimum registration. The "R" and "S" masks are also equipped (FIG. 1) with similar photo-electric transducers 38 and 39, respectively, to produce the registration signals.

The identification circuit and registration control circuit therefor are shown in FIG. 5. Although twelve image identification channels, including the numerals 0–9 and two special characters, and two registration channels are required for the mask member 32, shown in FIG. 3, only selected exemplary image channels and the registration channels have been chosen for description in FIG. 5. Each transducer 36–5, 36–4, 36–3, 38–R and 39–S are the respective transducers for the "5," "4," "3," "R," and "S" masks in mask member 32. These transducers are each connected in parallel from ground through the transducer and a variable resistor back to ground. Each variable resistor 40 is adjusted so that when the same quantity of dark image appears on each transducer, identical output signals will appear on the respective lines 45, 46, 47, 48 and 49. The adjustment is accomplished by temporarily substituting transparent masks for each mask position and projecting thereon identical images. For identification only the A.C. voltage change is used. Hence, the output signals from the transducers are supplied across capacitors to the respective differential amplifiers 50, 51, 52, 53 and 54. The amplified outputs are each supplied as an input on the base electrode of respective PNP transistors 60, 61, 62, 63 and 64 to operate as a control signal thereto.

The collector of each switching transistor 60–64 is connected through a resistor to a source of negative potential at respective terminals 65, 66, 67, 68 and 69; transistor output signals are supplied from the collectors of only the image mask channel transistors 60–62 as inputs to turn on respective conventional bistable indicating trigger circuits 70, 71 and 72, each equipped with suitable output terminals. The emitters of all transistors 60–64 are commonly connected via lines 76, 77 and 78 to a source of positive potential at terminal 80 through a resistor 81. A bias or threshold PNP transistor 82 has its emitter connected to resistor 81 and its collector connected to a source of negative potential at terminal 83. The base of transistor 82 is supplied with a potential at terminal 84 suitable to cause the transistor to conduct and produce the desired voltage drop across resistor 81 to establish the necessary emitter voltage for transistors 60–64. Also connected to resistor 81 via lines 76 and 79 is a feedback circuit, including capacitor 85 and resistor 86, for amplifiers 50–54. The feedback circuit is connected to the amplifiers on respective lines 90, 91, 92, 93 and 94 to supply a common degenerative feedback voltage to increase the percentage difference between parallel input signals from the photo-electric transducers which may differ on the order of one microvolt.

The operation of the circuit may be illustrated by considering the downwardly progressing image movement shown in FIGS. 4*a*, 4*b* and 4*c*. Before any projected image falls on the transparent area of any mask, transducers 36, 38 and 39 will produce different D.C. voltage levels because of varying quantities of transparent area. Since the amplifiers 50–54 are capacitively coupled to their respective transducers, no effective input signal is present at the switching transistor base electrodes. Hence each transistor will be switched off. Bias transistor 82 is supplied with a suitable negative voltage at terminal 84 to establish an emitter voltage for transistors 60–64 to insure that no conduction of these transistors will occur when no image is present on the mask transducers. As the images of the exemplary "5" move downwardly in FIG. 4*a*, the transducer 38–R is the first transducer to detect a change in light intensity and hence, will negatively alter its input signal to amplifier 53. As the images continue to move, the signal input to amplifier 53 will reach a point where the negative base signal for transistor 63 will exceed the emitter voltage by approximately 0.2 volt, sufficient to cause the transistor to conduct. When this transistor conducts, it draws additional current through a resistor 81 lowering the common emitter voltage, also producing a negative signal change across capacitor 85 and resistor 86 which decreases the effective input signal of all image and registration channels which may by this time have also sensed some images. The feedback signal effects an increase of the input signal differentials between channels.

Continued movement of the "5" images toward the position shown in FIG. 4*b* causes transducer 38–R to continue to produce the greatest signal change because the "R" mask is the one with the most image thereon. However, as soon as the "5" image on the "R" mask 34 begins to move to the opaque area of that mask the signal supplied by transducer 38–R starts to decrease. At this time the "5" image comes into full registration with the "5" mask and when image and mask coincide, the transducer 36–5 will produce an output signal exceeding that of any other transducer, because at that moment, the "5" mask transducer has the most image thereon. In consequence the signal change input to amplifier 50 will be greater than that supplied to any other amplifier; hence, the input to the base of transistor 60 will exceed the signal on the base of transistor 63 causing transistor 60 to turn on. Conduction of the latter transistor produces a positive pulse at the collector thereof which is sufficient to turn on the "5" trigger 70. Also, when transistor 60 turns on, the common emitter voltage is lowered sufficiently to turn off transistor 63. It will be observed from FIGS. 4*a* and 4*b* that each of the image and registration masks will be covered to some degree by the projected images, and each transducer is producing a signal of varying amplitude. However, signals from the remaining transducers are overridden by the larger signals first from transducer 38–R, and then from transducer 36–5 because the transducers for these channels were covered by the most image.

During the movement of the images up to this point, an image is falling on the "S" mask 35 in increasing amounts. However, the image on the "S" mask does not reach a maximum until the projected images have passed beyond the point of optimum registration with all other masks. As soon as the "5" image begins to pass onto the opaque area of the "5" mask, transducer 39–S, in back of the "S" mask will produce the largest output signal overriding all other channel signals and turn on transistor 64 which turns off transistor 60. Continued movement of the image will eventually cause all transistors to turn off when no transducer senses sufficient image to maintain conduction. When scanner 31 sweeps other rows of images downwardly across the masks, the selective conduction of transistors 60–64 will again occur. As evident from the foregoing description, the identification apparatus provides a control circuit which automatically limits image recognition to the approximate time of optimum registration between images and image masks. By means of the registration channels and bias transistor 82, image recognition is closely confined to the time that the images are fully or nearly fully registered.

In FIGS. 6 and 7 there is shown an alternative embodiment of the invention. In this embodiment light is conventionally supplied directly to the record surface and the internally reflective member is a single element. The scanner and lenses are arranged somewhat differently. This embodiment has the advantages of moving rows of images simultaneously without relative movement therebetween and of being less expensive to manufacture. However, it has the disadvantages over the first embodiment that the images are less intense and some of the fringe images are insufficiently distinct to permit use. More light loss and non-uniform record illumination occur. In the description of this embodiment, elements similar to those of the embodiment of FIG. 1 have the same reference numerals.

In the figures, record 10 having a line 12 of indicia thereon, is moved as in FIG. 1 along a predetermined path under an object shield 100 which limits light reflection to the desired scan area. By providing an appropriate shield, the contrast between image and background is improved at the mask member 32. One example of an object shield which may be used is shown in FIG. 7. Shield 100 is subjected to high temperatures due to the intense illumination and is preferably made of glass having a transparent area 101 with roughened or sand blasted areas 102 which are positioned under scanner 31. The remaining surface area 103 is ground and polished. Areas 102 and 103 are covered with a highly reflective coating such as silver or aluminum. Light from source 17 and shield 18 is directed toward the shield 100 and character area 101 illuminating the printed indicia and is reflected from record 10 to scanner 31 and a relay lens system 104 to form an image of the recorded indicium. Light striking surface 103 is reflected away from the scanner and the area appears black in the image plane because light therefrom does not reach lens 104. Surfaces 102 appear light at the image plane because light is reflected in many directions due to the roughened surface.

The light reflected from record 10 and areas 102 passes through scanner 31 and lens 104 which forms the indicium image at the lower end of internally reflective member 105. Member 105 is similar in configuration to member 13 of FIG. 1 except that it is formed as a single element without an intermediate reflecting surface. Light entering at the lower end is reflected upwardly a plurality of times from the reflective sides and creates a plurality of images from the single image projected thereon by lens 104. Lens system 30 collects light emerging from the top of member 105 and divergently focuses it on each image and registration mask in mask member 32, forming a plurality of images. In this embodiment, no relative movement occurs between adjacent rows of images because the rotating scanner 31 moves the single image from which the plurality of images are produced. Therefore, adjacent rows of images may be used permitting the mask rows to be moved closer together. In the system of FIG. 1, scanner 31 does not move the original image but instead is used to move the plurality of images after being formed.

The optical bars in the embodiments of either FIG. 1 or 6 may be supported by the apparatus shown in FIG. 8. The lower ends of the bars are each coated with narrow bands 110 of reflective material, such as silver, about which are secured a layer of resilient material 111, such as rubber, and a clamp 112. The optical bar is held in vertical alignment by a plurality of resiliently mounted brackets 113 each bearing in contact with the bar through a ball 114 located by an apertured clip 115 secured to bracket 113. This arrangement provides lateral support by substantially point contact. It is desirable that only minimum contact be made with the periphery of optical member 13 or 105 to minimize light loss. A plurality of the brackets are provided for each planar surface as necessary.

Although image multiplying members 13 and 105 have been described and illustrated as solid optical bars, mirror surfaces may be positioned parallel to an optical axis to form an internally reflective tunnel. The cross-sectional configuration of a solid bar or mirror tunnel is not limited to a rectangle but may be of some other configuration such as a square or triangle. The configuration used will accordingly vary the image distribution on mask member 32. Thus, image and registration masks would be appropriately relocated. If a mirror tunnel is used in the embodiment of FIG. 1, a conventional beam-splitter is required at surface 20 to properly direct light from source 17 downwardly in the lower tunnel portion and to permit returning light to pass into the upper tunnel portion.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a device for determining the identity of a recorded indicium of a group of indicia, each said indicium having a unique image, projection apparatus comprising, in combination:

mask means including an image mask of each of said indicia of said group;

image multiplying means having an optical axis and a plurality of reflective plane surfaces disposed parallel therewith for producing multiple images from a single image at one end of said axis;

means for introducing an image of said recorded indicium at said one end of said optical axis; and means at the other end of said optical axis for projecting each of said multiple images onto one of said image masks.

2. In a device for determining by its image the identity of a recorded indicium belonging to a limited group of indicia, each having a unique image, the combination comprising:

mask means including an image mask of each of said indicia in said group;

optical means for producing multiple images from a single image projected along an optical axis thereof, and including at least one member having a plurality of plane reflective surfaces disposed parallel with said axis;

means for introducing an image of said recorded indicium along said one end of said optical axis; and means at the other end of said optical axis for projecting each of said multiple images produced by said optical means onto a different one of said image masks.

3. In a device for determining the identity of a recorded indicium of a predetermined group of indicia, image matching apparatus comprising, in combination:

mask means including a mask for each of the characters of said group, each said mask having on an opaque background transparent areas corresponding to the image of a different one of said indicia;

image multiplying means having a plurality of reflective plane surfaces disposed parallel to a common optical axis for multiplying the image of an indicium appearing at one end of said axis;

means for reflectively projecting an entire image of said recorded character on one end of said axis; and means at the other end of said axis for focusing each of said character images simultaneously onto a different one of said masks.

4. In a device for determining the identity of a recorded indicium belonging to a limited group of indicia, each having a unique image, optical projection apparatus comprising, in combination:

mask means including a negative mask of each of the indicia of said group;

image multiplying means including a plurality of reflective plane surfaces disposed parallel to a common axis forming an internally reflective polygonal member, for multiplying an image appearing at one end of said member;

means for reflectively introducing the image of said recorded indicium on one end of said member;

means at the other end of said member for projecting each of said multiple images onto one of said negative masks; and scanning means for moving all of said images in a common direction across said masks.

5. In a device for determining by its image the identity of a recorded indicium belonging to a group of indicia, each having a unique image, projection apparatus comprising, in combination:

mask means including an image mask for each of said indicia in said group;

image multiplying means having an optical axis and a plurality of plane reflective surfaces disposed parallel therewith for producing multiple images from a single image at one end of said axis;

means for introducing an image of said recorded indicium at said one end of said axis;

means at the other end of said optical axis projecting each of said multiple images onto a different one of said image masks; and means associated with each of said masks for identifying the mask with which an image thereon coincides.

6. In an apparatus for determining by its image the identity of a recorded indicium belonging to a limited group of indicia, each having a unique characteristic image, the combination comprising:

mask means including a mask of the image of each said character;

optical multiplying means for producing a plurality of entire images equal in number at least to the number of indicia in said group when a single, entire image is projected thereon, said optical means including a plurality of plane reflective surfaces disposed about a common optical axis;

means for projecting an entire image of said recorded indicium along said optical axis; and means adjacent said multiplying means for focusing one of said plurality of images on each said mask.

7. Apparatus as described in claim 6 further including:

scanning means operable to move said focused images into registration with said masks; and means for identifying that one of said masks with which the said image thereon coincides.

8. An apparatus for determining by its image the identity of a recorded indicium belonging to a limited group of indicia, each having a unique characteristic image, the combination comprising:

mask means including a negative mask of each indicium in said group with each mask being opaque and having transparent areas therein corresponding in configuration and size to the image of a different one of said indicia;

optical multiplying means having a plurality of plane parallel reflective surfaces disposed about a common optical axis for producing plural images of an indicium image projected along one end of said axis;

means for projecting an image of said recorded indicium along one end of said axis;

means at the other end of said axis for focusing one of said image plurality on each said mask;

means adjacent each said mask for producing electrical signals proportional to the degree of correlation between each said mask area and the image focused thereon; and means for identifying from said signals that mask area-image combination producing the highest degree of coincidence.

9. In apparatus for determining by its image the identity of an indicium belonging to a limited group of indicia and recorded on a record member of contrasting background, the combination comprising:
- mask means including a negative mask of the image of each of said indicia in said group;
- optical means having a plurality of plane reflective surfaces parallel to an axis thereof for providing multiple internal reflections of an image projected thereon;
- means for illuminating said character and a limited area of said background;
- lens means for projecting an image of said character onto said optical means for multiplication therein;
- means for focusing one of said multiple images on each of said negative masks; and
- identification means for indicating that one of said negative masks with which its focused image coincides.

10. The combination as described in claim 9 further including:
- means for causing said focused images to move simultaneously across said negative masks.

11. The combination as described in claim 9 further comprising:
- means acting upon said record member for moving said indicium so as to cause said focused images to move in one of two coordinate directions across said negative mask; and
- scanning means acting upon said projected images so as to cause said focused images to move in the other of said two coordinate directions across said negative mask.

12. An optical device comprising, in combination:
- a first elongated, internally reflective element having one end thereof formed as a transverse plane normal to the longitudinal axis of said element and the other end thereof formed as a transverse plane obliquely disposed relative to said one end; and
- a second elongated, internally reflective element having a longitudinal axis tandemly aligned with the axis of said first element and its end nonadjacent said first element being formed as a transverse plane normal to said axis and the end adjacent said first element formed as a plane parallel to said other end.

13. A device for illuminating a recorded indicium and providing an image thereof at an image receiving member comprising:
- a source of light;
- a first element adjacent said indicium for conducting light in opposite directions therein and having a reflective portion disposed relative to said source for reflecting light to said indicium to receive a reflected image therefrom; and
- a second element axially aligned with first element for transmitting said image to said receiving member.

14. An optical device, comprising, in combination:
- first and second elongated, internally reflective light conducting elements aligned on a common longitudinal axis with their adjacent ends forming spaced parallel planes obliquely intersecting said axis and their opposite ends forming parallel planes normal to said axis; and
- means for projecting light against one of said oblique adjacent plane ends so that said light is internally reflected within that said element.

15. In image multiplication apparatus, the combination comprising:
- a source of light;
- light directing means; and
- an internally reflective pair of elongated light conducting members having plane reflective surfaces disposed parallel to a common axis with opposite planar ends normal to said axis and having therebetween a transverse planar reflecting surface obliquely disposed relative to said ends for directing light from said source internally of a said member.

16. In apparatus for producing multiple images, the combination comprising:
- a source of light; and
- first and second elongated, internally reflective light conducting members tandemly aligned along a common optical axis, each said member being formed with a corresponding plurality of plane surfaces arranged to said axis and having opposite planar end surfaces normal to said axis, and parallel spaced adjacent planar end surfaces obliquely disposed relative to said axis so that said adjacent end of said first member reflects light from said source internally of said first member.

17. In image multiplying apparatus the combination comprising:
- a source of light;
- a first elongated light conducting member in a plurality of plane reflecting surfaces parallel to an axis thereof for internally reflecting light therein, said member having an end normal to said axis and a planar end obliquely disposed relative to said axis and said source to reflect light from said source internally of said member; and
- a second elongated light conducting member having a plurality of plane reflective surfaces parallel to an optical axis thereof tandemly aligned with said axis of said first member, said second member having a first end nonadjacent said first member normal to said axis and a second end spaced from and parallel to said obliquely disposed end.

18. Apparatus for multiplying the image of an indicium recorded on a record area comprising, in combination:
- a light source;
- a first elongated member having a plurality of plane reflective surfaces disposed parallel to an axis thereof for providing multiple internal reflections of light, said member having a planar end obliquely disposed relative to said axis and said light for reflecting said light in a forward direction internally of said member and another end;
- a second elongated member having a respective plurality of plane reflective surfaces each lying in a plane corresponding to said surfaces of said first member and tandemly aligned therewith for providing multiple internal reflections of light, and having a planar end adjacent said first member spaced from and parallel to said obliquely disposed end and a nonadjacent end; and
- means for positioning said recorded indicium adjacent said other end of said first member, whereby light from said source is reflected onto said recorded indicium in said record area so that an image of said indicium is formed by light reflected in a reverse direction from said record area off said pluralities of plane surfaces of said first and second members to produce multiple images of said indicium at said nonadjacent end of said second member.

19. Apparatus for multiplying the image of an indicium recorded on a record area comprising, in combination:
- a light source;
- a first elongated member having a plurality of plane reflective surfaces disposed parallel to an axis thereof for producing multiple internal reflections of light, said member having a planar end normal to said axis and a planar end obliquely disposed relative to said axis and light from said source for reflecting said light to a first direction internally of said member;
- a second elongated member for producing multiple internal reflections of light and having a plurality of plane reflective surfaces each lying in the plane of a different one of said surfaces of said first member and tandemly aligned therewith, said second member having a planar end nonadjacent said first member normal to said axis and an adjacent planar end spaced from and parallel to said angularly disposed end of said first member;

means for positioning said area and indicium operative association with said normal end of said first member so as to receive light from said first member and reflect an image of said indicium thereinto;

mask means including a negative mask of each of said characters; and means adjacent said nonadjacent normal end of said second member for focusing multiple images therefrom each onto a different one of said masks.

20. Apparatus for determining by its image the identity of an indicium recorded on a record and belonging to a limited group of indicia each having a unique image, said indicium and record being of contrasting reflectivity, the combination comprising:

a source of light;

first and second optical elements tandemly aligned along a common optical axis and each having a plurality of plane reflective surfaces parallel to said axis for providing multiple internal reflections of light projected thereon, said first element having one end located adjacent said recorded indicium and the other end being a planar surface obliquely disposed relative to light from said source and said axis for reflecting said light internally of said member to said record and receiving reversely reflected light therefrom to produce a plurality of images of said indicium, said second element having one end parallel to said obliquely disposed end and its other end exposed for transmitting said images;

mask means including a negative mask of the image of each of said characters in said group;

means adjacent said exposed end for focusing one of said images on each said mask; and identification means for indicating the mask most closely coinciding with its said focused image.

References Cited by the Examiner

UNITED STATES PATENTS

| | | | |
|---|---|---|---|
| 1,577,388 | 3/1926 | Twyman | 88—24 |
| 2,933,246 | 4/1960 | Rabinow | 235—61.11 |

MALCOLM A. MORRISON, *Primary Examiner.*